May 5, 1970  W. E. FRITZ  3,509,828
RAILWAY HOPPER CAR GATE OUTLET
Filed March 13, 1968  2 Sheets-Sheet 1

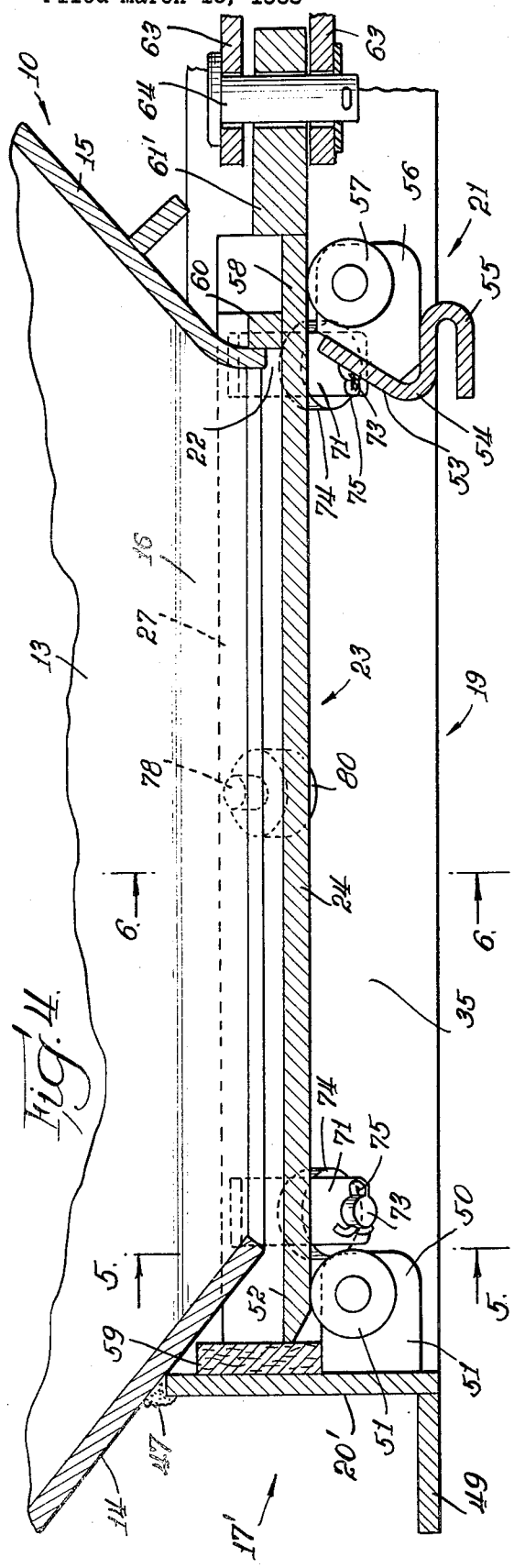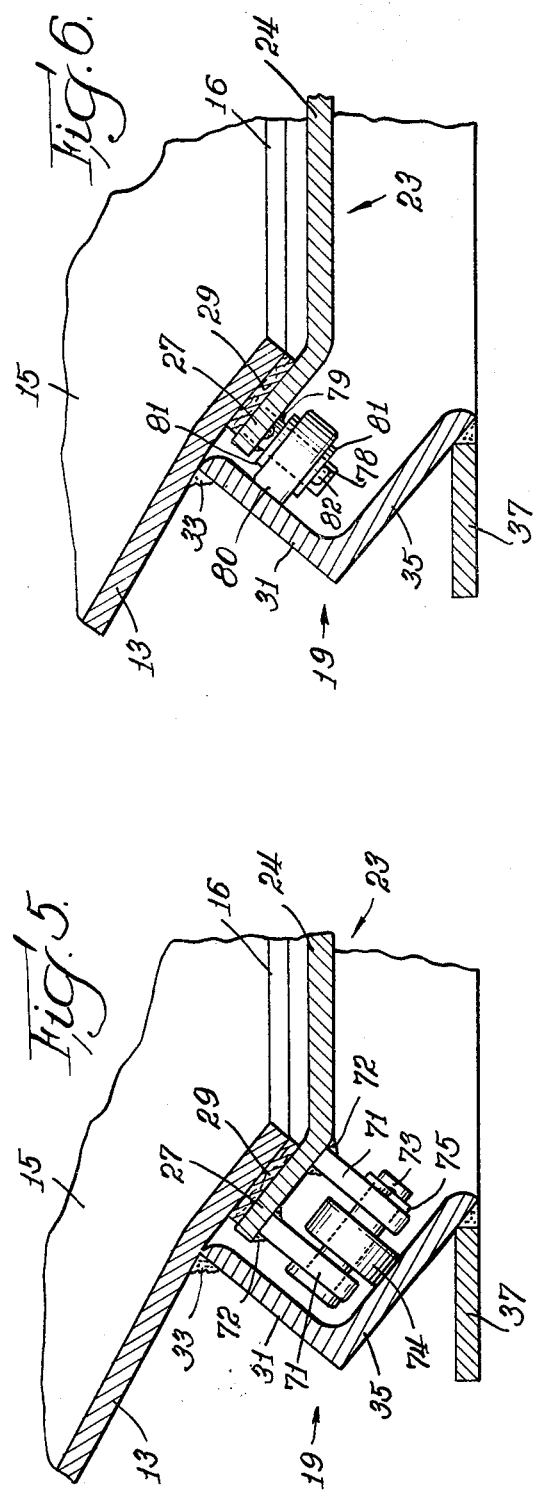

United States Patent Office 3,509,828
Patented May 5, 1970

3,509,828
RAILWAY HOPPER CAR GATE OUTLET
William E. Fritz, Clarendon Hills, Ill., assignor to Fabko Engineering Company, Inc., Clarendon Hills, Ill., a corporation of Illinois
Continuation-in-part of application Ser. No. 700,392, Jan. 25, 1968. This application Mar. 13, 1968, Ser. No. 712,824
Int. Cl. B61d 7/06, 7/20, 7/24
U.S. Cl. 105—282         10 Claims

ABSTRACT OF THE DISCLOSURE

A sliding gate for closing the discharge opening of a hopper is mounted for movement on rollers mounted for rotation about inclined axes on the discharge chute for engaging the undersurfaces of upturned sides of the gate and mounted on the gate for engaging inclined upturned surfaces on the discharge chute.

---

This application is a continuation-in-part of application Ser. No. 700,392, filed Jan. 25, 1968, now abandoned.

This invention is an improvement over the construction disclosed in Fritz U.S. Pat. 3,183,852, issued May 18, 1965.

Among the objects of this invention are: To provide for supporting the gate of a discharge hopper to move between closed and open position in a new and improved manner; to support the gate in such manner as to prevent it from canting from side to side and with rolling friction due to forces acting downwardly on the gate during the opening movement; to construct the gate with upwardly inclined sides and to support the gate for movement by rollers carried by the side walls of an underlying discharge chute and mounted to rotate about axes substantially parallel to these inclined sides or by rollers carried by the inclined sides of the gate for engagement with inclined side wall sections of the discharge chute; to provide a seal against the escape of lading between the upper surface of the gate and the undersurface of the hopper; and to avoid the use of ledges on the discharge chute on which undesirable small portions of lading may be retained.

According to this invention a hopper having downwardly inclined side and end walls defines an opening through which granular lading is discharged downwardly through an underlying chute having downwardly extending side and end walls. A gate for closing the discharge opening is movable through a slot formed between end walls of the hopper and the discharge chute. The gate has upwardly inclined sides underlying the lower portions of the upper side walls. According to one embodiment, the gate is supported for translatory movement by rollers carried by inclined side walls of the discharge chute to rotate about axes substantially parallel to the inclined sides of the gate. Rollers also support the gate at its ends and are arranged to rotate about horizontal axes. The upper surfaces of the inclined sides of the gate are arranged to have sealing engagement with the overlying side walls of the hopper. The top surface of the gate is well spaced from the discharge chute to reduce to a minimum the likelihood of binding therebetween during movement of the gate due to large granules of lading. In another embodiment the rollers are mounted on the inclined sides of the gate for rolling engagement with the inclined side walls of the discharge chute. A pair of rollers at the sides of each end of the gate rotate about axes parallel to the respective inclined sides of the gate and engage sections of the side walls of the discharge chute parallel to the inclined sides of the gate. Another pair of rollers at the sides of the gate intermediate its ends rotate about axes at right angles to the respective inclined sides of the gate and engage sections of the side walls of the discharge chute parallel to these axes.

In the drawings:

FIG. 4 is a vertical sectional view similar to FIG. 2 but at an enlarged scale and shows a modified construction in which rollers are mounted on inclined sides of the gate for rolling engagement with inclined side walls of the discharge chute.

FIG. 5 is a vertical sectional view taken generally along line 5—5 of FIG. 4.

FIG. 6 is a vertical sectional view taken generally along line 6—6 of FIG. 4.

Figure 1:
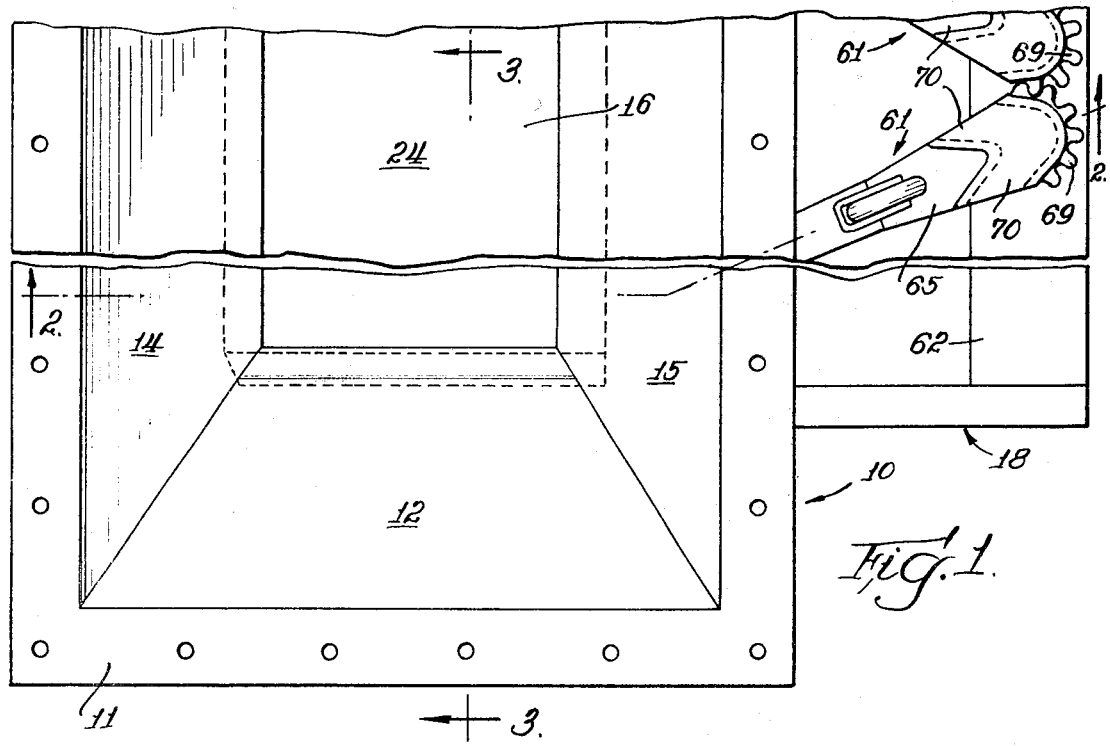
FIG. 1 is a top plan view of a portion of a hopper outlet construction in which this invention is embodied, the gate being shown in closed position and supported by rollers carried by inclined side walls of the discharge chute.
Figure 2:
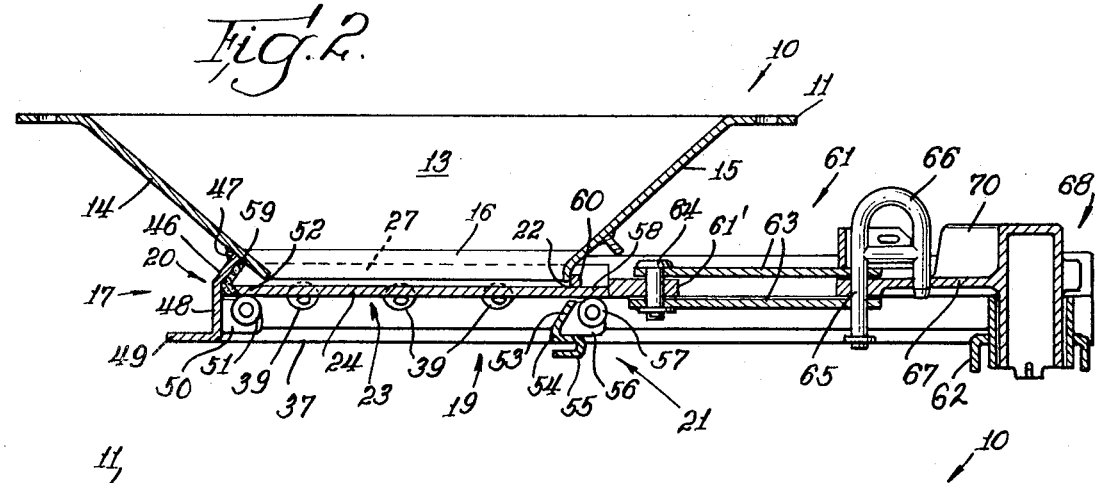
FIG. 2 is a vertical sectional view taken generally along line 2—2 of FIG. 1 and shows the gate in closed position.
Figure 3:
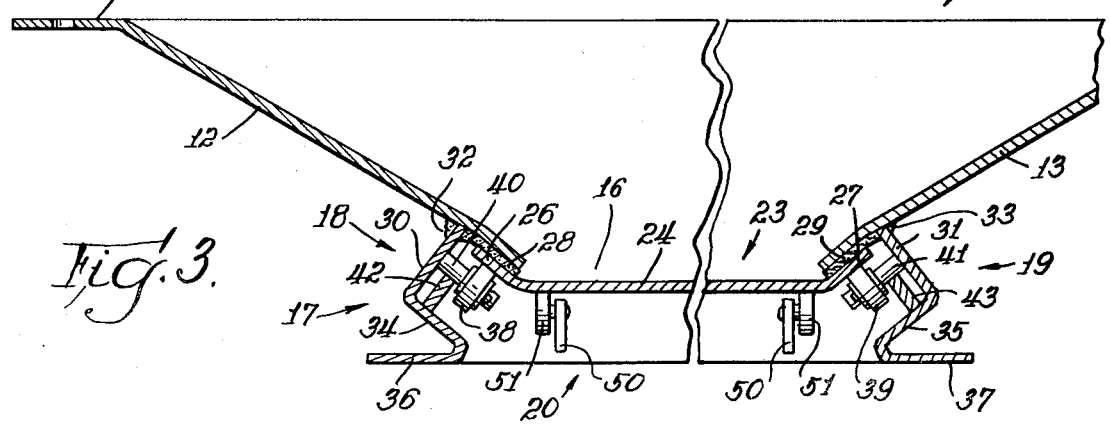
FIG. 3 is a vertical sectional view taken generally along line 3—3 of FIG. 1 and shows both sides of the hopper outlet construction.

In FIGS. 1, 2 and 3 a hopper outlet for railway cars or the like is indicated, generally, at 10. It is formed of suitable sheet metal and includes a marginal flange 11 that is arranged to be secured as by bolting to the underside of a hopper car which is arranged to transport granular lading. Inclined side walls 12 and 13 and inclined end walls 14 and 15 extend downwardly from the marginal flange 11 and at their lower ends define a discharge opening 16. Below the discharge opening 16 and surrounding it is a discharge chute that is indicated, generally, at 17. The discharge chute 17 includes chute side walls 18 and 19 and chute end walls 20 and 21 which underlie the respective side walls 12 and 13 and end walls 14 and 15 of the hopper 10.

Between the end walls 15 and 21 there is a slot 22 through which a gate, indicated generally at 23, is movable for closing the discharge opening 16 and for controlling the flow of lading downwardly therethrough. The gate 23 is formed of sheet metal and has a flat bottom 24 which is spaced a substantial distance below the lower edges of the side and end walls 12–15 of the hopper outlet 10 so that there is little likelihood of binding of the gate 23 in its movement due to large granules of the lading. The gate 23 is provided with upturned sides 26 and 27 which underlie the lower portions of the side walls 12 and 13. Gaskets 28 and 29 of fibrous sealing material can be provided on the upper sides of the upturned sides 26 and 27 to provide a good seal with the juxtaposed side walls 12 and 13 when the gate 23 is in the closed position.

As shown in FIG. 3 the chute side walls 18 and 19 have upwardly inclined sections 30 and 31 which are secured as by welding at 32 and 33 to the undersides of the side walls 12 and 13. The chute side walls 18 and 19 also include downwardly inclined sections 34 and 35 which terminate in outwardly extending horizontal sections 36 and 37 that are arranged to have a conveyor chute (not shown) attached thereto. By providing the inclined sections 30 and 31 and 34 and 35 the downward flow of lading through the chute 17 is facilitated and there is little likelihood of any particles of the lading being retained once the hopper outlet 10 has been unloaded.

In order to prevent canting of the gate 23 in its translatory movement between closed and open positions, rollers 38 and 39 are provided that are rotatable about inclined axes parallel to the upturned sides 26 and 27 on stub shafts 40 and 41. Preferably the rollers 38 and 39 are formed of plastic material such as nylon. The stub shafts 40 and 41 are secured as by welding to the inner sides of the upwardly inclined sections 30 and 31. The stub shafts 40 and 41 are reenforced by supports 42 and 43 that extends at right angles thereto from the downwardly inclined sections 34 and 35 to which they are welded. Preferably three rollers 38 and 39 are provided on each side as indicated in FIG. 2 and by forming them of nylon or similar material they are capable of resisting abrasion and reduce to a minimum friction involved in the translatory movement of the gate 23.

In FIG. 2 it will be observed that an upper section 46 of the end wall 20 of the chute 17 is welded, as indicated at 47, to the underside of the end wall 14. The end wall 20 also includes a vertical section 48 that terminates in an outwardly extending horizontal section 49 for receiving the conveyor chute above referred to.

Extending inwardly from the vertical section 48 of the end wall 20 are support plates 50 on which rollers 51 are mounted for rotation about a horizontal axis. These rollers 51 engage the under side of the leading end 52 of the gate 23 when it is in the fully closed position as shown in FIG. 2. They may be formed of nylon.

The chute end wall 21 extends between the chute side walls 18 and 19 and is welded thereto at its ends. The chute end wall 21 includes an inclined section 53 that extends downwardly below the slot 22. At its lower end there is a narrow vertical section 54 that is formed integrally with a reverse turn section 55 that is employed for receiving the conveyor chute above referred to. The configuration of the chute end walls 20 and 21, as described and shown in FIG. 2, employs no horizontal sections on which lading is likely to lie. Extending laterally from the chute end wall 21 are support plates 56 of which there may be two in number for carrying rollers 57 that may be formed of nylon and are arranged to underlie the trailing end 58 of the gate 23 in its closed position. The rollers 57 which rotate about a horizontal axis are arranged to support the gate 23 in its movement from the closed to the open position.

In order to seal the leading end 52 of the gate 23 in the closed position a resilient gasket 59 is located along the inner side of the chute end wall 20 and is arranged to be engaged by the foward edge of the gate 23 when it is closed. At the trailing end 58 of the gate 23 a transverse bar or gasket 60 is provided that is arranged to engage the lower edge portion of the end wall 15 in the closed position of the gate 23.

Any suitable mechanism can be provided for moving the gate 23 between the closed and the open positions. As shown in FIGS. 1 and 2 operating linkages, indicated generally at 61, can be employed for this purpose. Laterally extending lugs 61' are secured to the trailing end 58 of the gate 23 for this purpose. The linkages 61 operate between these lugs 61' and a transverse channel 62 that extends between and is secured to extensions of the chute side walls 18 and 19. Each operating linkage 61 includes links 63 that are secured by a pivot pin 64 to the respective lug 61'. The other ends of the links 63 are connected by an arm 67 which is rotatably mounted at 68 on the transverse channel 62. The gear sections 69 serve to mechanically interconnect the linkages 61 to provide for conjoint operation in the movement of the gate 23. Operating bar receiving sockets 70 are provided to permit manual operation of the linkages 61 from either side of the hopper outlet 10.

FIGS. 4, 5 and 6 show a modification of this invention the difference over the construction shown in FIGS. 1, 2 and 3 residing in the fact that the rollers are mounted on the gate 23 instead of being mounted on the discharge chute 17 as is the case for the rollers 38 and 39. In FIG. 4 it will be observed that the discharge chute 17' corresponds to the discharge chute 17 shown in FIGS. 2 and 3. It is slightly different in construction in that a chute end wall 20' is employed which is vertical in configuration rather than angular as is the end wall 20. The horizontal section 49 extends from the lower end of the chute end wall 20'.

In FIG. 5 it will be observed that support plates 71 are welded at 72 in spaced relation to the under side of the upturned side 27 of the gate 23. A roller support pin 73 extends through the apertured distal ends of the support plates 71 and a roller 74, formed of plastic such as nylon, is mounted on the support pin 73. A cotter pin 75 holds the support pin 73 in place. It will be understood that a pair of rollers 74 is provided at the leading end 52 of the gate 23 on opposite sides thereof and that in a similar manner a pair of rollers 74 is provided on opposite sides of the trailing end 58 of the gate 23. The several rollers 74 are arranged to have rolling engagement with the downwardly inclined sections 34 and 35 of the chute side walls 18 and 19.

As an aid to eliminating canting of the gate 23 in its movement between closed and open positions an additional means are provided. For this purpose as shown in FIG. 6 a stub shaft 78 is welded at 79 to the under side of the upturned sides 26 and 27 of the gate 23. As shown in FIG. 4 the stub shafts 78 are located intermediate the leading and trailing ends 52 and 58 of the gate 23. On each stub shaft 78 a roller 80, of plastic such as nylon, is mounted. Washers 81 are provided on opposite sides of each roller 80 and a coter pin 82 serves to hold the roller 80 and washers 81 in place. The rollers 80 are arranged to engage the upwardly inclined sections 30 and 31 of the chute side walls 18 and 19.

With a view to reducing to a minimum the weight of the hopper outlet 10 and parts associated therewith, they are formed principally of aluminum. Difficulty has been encountered in slidably supporting a gate formed of aluminum on aluminum runners. Accordingly, it has been found that when the gate 23 is supported in the manner as disclosed herein either using rollers 38 and 39 mounted on the discharge chute 17 or rollers 74 and 80 mounted on the gate 23, the movement of the gate 23 can be readily accomplished particularly when the gate 23 is overlaid by lading and must necessarily be moved to the open position while it is being subjected to a relatively great downward force.

What is claimed as new is:

1. A discharge outlet assembly comprising:
    a hopper having downwardly inclined side and end walls defining a horizontal discharge opening,
    a discharge chute having inclined side walls and end walls secured to said hopper and extending below said discharge opening,
    a horizontal gate for closing said discharge opening and having upturned sides underlying the lower portions of said side walls of said hopper, and
    a spaced set of rollers along each of said sides of said gate and mounted to rotate about inclined axes between said gate and said side walls of said discharge chute for supporting each side of said gate in its movement between closed position and open position.

2. The discharge outlet according to claim 1 wherein rollers at the ends of said gate in its closed position are mounted on said discharge chute to rotate about horizontal axes and support said gate in said closed position.

3. The discharge outlet according to claim 1 wherein said side walls of said discharge chute extend substantially at right angles from the respective side walls of said hopper, and
    said rollers are mounted for rotation on supports extending substantially at right angles from said side walls of said discharge chute.

4. The discharge outlet according to claim 3 wherein a plurality of rollers are mounted to rotate about inclined axes on each of said side walls of said discharge chute.

5. The discharge outlet according to claim 1 wherein rollers are mounted on said discharge chute to rotate about axes substantially parallel to the central portion of said gate and engage the underside thereof to support the same in closed position and lading thereon.

6. The discharge outlet according to claim 1 wherein sealing means is interposed between the upper surfaces of said upturned sides of said gate and the under surfaces of said side walls of said hopper.

7. The discharge outlet according to claim 1 wherein there is substantial space between the top surface of said gate and said discharge chute to minimize binding therebetween during movement of said gate caused by large granules of lading.

8. The discharge outlet according to claim 1 wherein said side walls of said discharge chute include sections generally parallel to said upturned sides of said gate, and means mount said rollers on said upturned sides of said gate for rolling engagement with said sections of said discharge chute.

9. The discharge outlet according to claim 8 wherein said side walls of said discharge chute include sections extending generally at right angles to said upturned sides of said gate, and means mount additional rollers on said upturned sides of said gate for rolling engagement with the last mentioned sections of said discharge chute.

10. The discharge outlet according to claim 9 wherein there is a pair of rollers at the sides of each end of said gate for engaging said sections of said discharge chute parallel to said upturned sides of said gate and a pair of rollers at the sides of said gate intermediate its ends for engaging said sections of said side walls of said discharge chute that extend at right angles to said upturned sides of said gate.

References Cited

UNITED STATES PATENTS

| | | | |
|---|---|---|---|
| 656,591 | 8/1900 | West | 105—282 X |
| 1,392,371 | 10/1921 | Villiamo | 105—282 X |
| 1,715,307 | 5/1929 | Porter | 105—282 |
| 2,317,007 | 4/1943 | Weniger | 222—542 |
| 3,109,388 | 11/1963 | Dorey | 105—282 X |
| 3,133,509 | 5/1964 | Farmer | 105—282 X |
| 3,183,852 | 5/1965 | Fritz | 105—282 |

FOREIGN PATENTS 2,674  5/1894  Great Britain.

ARTHUR L. LA POINT, Primary Examiner

H. BELTRAN, Assistant Examiner

U.S. Cl. X.R.
105—286, 299, 304